(No Model.)
J. VINCENT.
SNOW PLOW.
No. 383,925. Patented June 5, 1888.
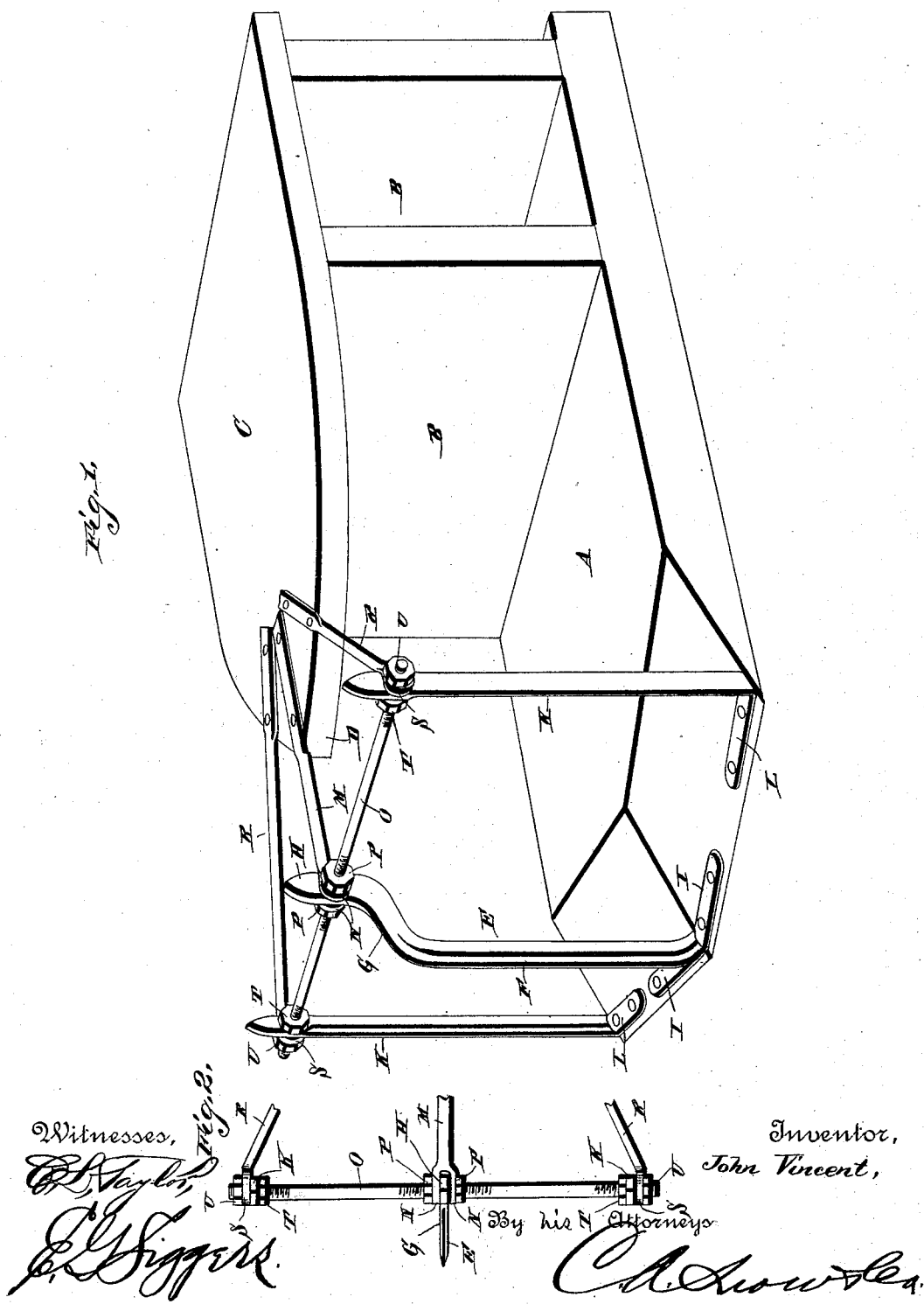

UNITED STATES PATENT OFFICE.

JOHN VINCENT, OF HOULTON, MAINE.

SNOW-PLOW.

SPECIFICATION forming part of Letters Patent No. 383,925, dated June 5, 1888.

Application filed February 4, 1888. Serial No. 263,057. (No model.)

*To all whom it may concern:*

Be it known that I, JOHN VINCENT, a subject of the Queen of Great Britain, residing at Houlton, in the county of Aroostook and State of Maine, have invented a new and useful Improvement in Snow-Plows, of which the following is a specification.

My invention relates to an improvement in snow-plows; and it consists in the peculiar construction and combination of devices, that will be more fully set forth hereinafter, and particularly pointed out in the claims.

In the accompanying drawings, Figure 1 is a perspective view of a portion of a snow-plow embodying my improvements. Fig. 2 is a detail top plan view.

A represents the base of the plow, which is pointed at its front end, as shown, and has its angular front sides beveled or inclined rearwardly and upwardly. Arranged transversely on the base A are the series of partitions or standards B, which extend vertically and support a top, C, the front end of which is curved on opposite sides to a point, D.

E represents a cutter, which is made of iron or steel, and comprises a vertical blade, F, having its upper end curved rearwardly, as at G, and then extended vertically, as at H, and having its lower end bifurcated to form supporting arms or bases I, which extend in opposite directions. The said arms or bases I are bolted to the inclined front side of the plow at the center thereof and near its lower edge, so as to arrange the blade or cutter in line with the center of the plow. The said blade or cutter is beveled on opposite sides to form a sharp cutting-edge, as shown.

K represents a pair of vertical cutting-blades, which are beveled on their opposing inner sides and have their lower ends bent at right angles to form inwardly-extending arms or bases L, which bear upon the inclined front edges of the plow, are bolted thereto, and support the blades or cutters K on opposite sides of the plow.

M represents a central brace-rod, which is bolted to the top C at the center thereof, and projects forward beyond its front end, and has its front end bifurcated to form a pair of ears, N, which bear upon opposite sides of the vertical extension H of the cutter E.

O represents a transverse bolt-rod, which extends through aligned openings in the upper ends of the cutters E and K, and is provided at its central portion and at its extremities with screw-threads. Nuts P are screwed to the central portion of the said bolt-rod and bear on the outer sides of the ears N of brace-rod M, and thus effectually prevent the upper end of the central cutter, E, from moving laterally.

R represents a pair of diagonal brace-rods, which are bolted to the top C on opposite sides of the brace-rod B, and are provided at their front end with ears S, which bear against the outer sides of the upper ends of cutters K, and are provided with central openings through which the ends of the bolt-rods extend. Nuts T are screwed on the bolt-rod and bear against the inner sides of the cutters K, and nuts U are screwed to the extremities of the said bolt and bear against the outer sides of the ears S, and thus clamp the upper ends of the cutters K rigidly between the said ears and to the nuts T.

The function of the cutters E and K is to cut the vertical sides through that portion of the snow-drift in front of the plow and to divide the same in the center and facilitate the operation of the snow-plow.

Having thus described my invention, I claim—

1. The snow-plow having the base A and top C, in combination with the vertical cutters secured to the sides and center of the base at the front end thereof, the bolt-rod extending through and connecting the upper ends of said cutters, and the brace-rods secured to the top and to the upper end of the cutters to prevent the same from moving laterally, substantially as described.

2. The combination, in a snow-plow, of the base A, the top C, the vertical cutters secured to the sides and center of the base at the front end thereof, the brace-rod B, projecting forward from the center of the top, and having the ears N, bearing on opposite sides of the upper end of the central cutter, the diagonal brace-rods R, secured to the top C and having ears at their front ends bearing against the outer sides of the upper ends of the side cutters, and the bolt-rod arranged transversely and extending through aligned openings in the upper ends of the cutters and in the ears of the brace-rods, said bolt-rods having the clamping-nuts, for the purpose set forth, substantially as described.

In testimony that I claim the foregoing as my own I have hereto affixed my signature in presence of two witnesses.

JOHN VINCENT.

Witnesses:
MARY JOSEPHINE WEBBER,
JAMES H. KIDDER.